(12) United States Patent
Morningstar, Jr. et al.

(10) Patent No.: US 9,126,851 B2
(45) Date of Patent: Sep. 8, 2015

(54) UV WATER TREATMENT PLANT WITH OPEN CHANNEL

(71) Applicant: XYLEM WATER SOLUTIONS HERFORD GMBH, Herford (DE)

(72) Inventors: Leroy Jack Morningstar, Jr., Charlotte, NC (US); Sven Kämmerer, Bad Salzuflen (DE); Madhukar Rapaka, Warangal (IN); Friedhelm Krüger, Lemgo (DE); Daniel Raymond, York, SC (US)

(73) Assignee: Xylem Water Solutions Herford GmbH, Herford (DE)

( * ) Notice: Subject to any disclaimer, the term of this patent is extended or adjusted under 35 U.S.C. 154(b) by 0 days.

(21) Appl. No.: 14/398,637

(22) PCT Filed: Mar. 6, 2013

(86) PCT No.: PCT/EP2013/000655
§ 371 (c)(1),
(2) Date: Nov. 3, 2014

(87) PCT Pub. No.: WO2013/164049
PCT Pub. Date: Nov. 7, 2013

(65) Prior Publication Data
US 2015/0108372 A1    Apr. 23, 2015

(30) Foreign Application Priority Data
May 4, 2012    (DE) .......................... 10 2012 008 733

(51) Int. Cl.
*C02F 1/32* (2006.01)
*A61L 2/10* (2006.01)

(52) U.S. Cl.
CPC ......... *C02F 1/325* (2013.01); *C02F 2201/3225* (2013.01); *C02F 2201/3227* (2013.01); *C02F 2303/04* (2013.01); *C02F 2303/14* (2013.01)

(58) Field of Classification Search
CPC ............ C02F 1/325; C02F 1/32; C02F 1/006; A61L 2/10; A61L 2/08; B01J 19/123
USPC ............. 250/436, 435, 432 R, 431, 437, 438, 250/504 R, 455.11, 365, 461.1; 422/186.3, 422/24, 186; 210/748.11, 748.1, 198.1, 210/105, 199, 205, 614, 748.01
See application file for complete search history.

(56) References Cited

U.S. PATENT DOCUMENTS 1,150,117 A    8/1915    Henri et al.
4,204,956 A *  5/1980    Flatow ............................ 210/87

(Continued)

FOREIGN PATENT DOCUMENTS

| AU | 2010 100 165 A4 | 3/2010 |
|----|-----------------|--------|
| DE | 41 19 725 A1 | 1/1993 |
| WO | WO 99/14161 A1 | 3/1999 |

OTHER PUBLICATIONS

International Search Report, dated Jun. 25, 2013, corresponding to International Patent Application No. PCT/EP2013/000655, filed Mar. 6, 2013.

(Continued)

*Primary Examiner* — David A Vanore
(74) *Attorney, Agent, or Firm* — RatnerPrestia (57) ABSTRACT

A UV water treatment plant having at least one module which contains a number of elongated UV lamps in a bracket, wherein the lamps are orientated in parallel to one another, wherein a base having at least one guide connected firmly to the base and at least one guide rail connected to the bracket are provided, wherein the guide rail is mounted to be displaceable in the guide.

11 Claims, 5 Drawing Sheets

(56) References Cited

U.S. PATENT DOCUMENTS

| | | | |
|---|---|---|---|
| 4,367,410 A * | 1/1983 | Wood | 250/431 |
| 4,482,809 A | 11/1984 | Maarschalkerweerd | |
| 4,899,056 A * | 2/1990 | Ellner | 250/431 |
| 5,019,256 A * | 5/1991 | Ifill et al. | 210/232 |
| 5,124,131 A * | 6/1992 | Wekhof | 422/186.3 |
| 5,332,388 A | 7/1994 | Schuerch et al. | |
| 5,368,826 A * | 11/1994 | Weltz et al. | 422/243 |
| 5,564,765 A | 10/1996 | Schuerch et al. | |
| 5,660,719 A | 8/1997 | Kurtz et al. | |
| 5,725,757 A * | 3/1998 | Binot | 210/85 |
| 5,843,374 A * | 12/1998 | Sizer et al. | 422/24 |
| 5,952,663 A * | 9/1999 | Blatchley et al. | 250/435 |
| 6,224,759 B1 * | 5/2001 | Whitby et al. | 210/198.1 |
| 6,231,820 B1 | 5/2001 | Wedekamp | 422/186.3 |
| 6,315,887 B1 * | 11/2001 | Salama | 205/701 |
| 6,342,188 B1 * | 1/2002 | Pearcey et al. | 422/186.3 |
| 6,576,189 B1 * | 6/2003 | Wedekamp | 422/23 |
| 6,614,028 B1 * | 9/2003 | Cekic et al. | 250/435 |
| 6,783,670 B1 * | 8/2004 | Berson | 210/154 |
| 6,911,655 B2 * | 6/2005 | Snowball | 250/431 |
| 7,097,764 B2 * | 8/2006 | Neofotistos | 210/192 |
| 7,317,193 B2 * | 1/2008 | Girodet | 250/455.11 |
| 7,327,087 B2 * | 2/2008 | Wang | 313/635 |
| 7,947,228 B2 * | 5/2011 | Girodet et al. | 422/121 |
| 7,975,400 B2 * | 7/2011 | Dittmer et al. | 34/528 |
| 8,129,696 B2 * | 3/2012 | Miller | 250/432 R |
| 8,177,349 B2 * | 5/2012 | Fukui | 347/102 |
| 8,350,228 B2 * | 1/2013 | Welker | 250/455.11 |
| 8,414,779 B2 * | 4/2013 | Levy | 210/748.11 |
| 8,481,970 B2 * | 7/2013 | Cooper et al. | 250/455.11 |
| 8,546,766 B2 * | 10/2013 | Greuel | 250/373 |
| 8,679,416 B2 * | 3/2014 | Traubenberg et al. | 422/186 |
| 8,742,364 B2 * | 6/2014 | Boodaghians et al. | 250/436 |
| 8,859,989 B2 * | 10/2014 | From et al. | 250/435 |
| 2002/0100679 A1 | 8/2002 | Wedekamp | |
| 2002/0113021 A1 * | 8/2002 | Traubenberg et al. | 210/748 |
| 2004/0069954 A1 | 4/2004 | Traubenberg et al. | |
| 2008/0260602 A1 | 10/2008 | Traubenberg et al. | |
| 2009/0045750 A1 * | 2/2009 | Briggs et al. | 315/157 |
| 2014/0138308 A1 * | 5/2014 | Elger et al. | 210/605 |
| 2015/0108372 A1 * | 4/2015 | Morningstar et al. | 250/492.1 |

OTHER PUBLICATIONS

International Preliminary Report on Patentability, dated Nov. 4, 2014, corresponding to counterpart International Patent Application No. PCT/EP2013/000655, filed Mar. 6, 2013.

* cited by examiner

UV WATER TREATMENT PLANT WITH OPEN CHANNEL

CROSS-REFERENCE TO RELATED APPLICATIONS

This patent application is a U.S. National Phase Patent Application of PCT Application No. PCT/EP2013/000655, filed Mar. 6, 2013, which claims priority to German Patent Application No. 102012008733.0, filed May 4, 2012, each of which is incorporated by reference herein in its entirety.

FIELD OF THE INVENTION

The present invention relates to a UV water treatment plant having at least one module which contains a number of elongated UV lamps in a bracket, wherein the lamps are orientated in parallel to one another, wherein a base having at least one guide connected firmly to the base and at least one guide rail connected to the bracket are provided, wherein the guide rail is mounted to be displaceable in the guide.

BACKGROUND OF THE INVENTION

It has long been known that UV radiation has a germicidal effect and that the naturally occurring UV radiation in sunlight has a disinfecting effect at a sufficient intensity and duration. For the disinfection of water and wastewater, UV radiation is used in small and large plants, see for example patent specification U.S. Pat. No. 1,150,117, which is incorporated by reference herein. Therein a distinction can be made between plants in which UV lamps are arranged in closed channels and such plants in which the UV lamps are arranged in channels that are upwardly open, so-called gutters. The second design with open gutters is used predominately in wastewater technology. The clarified wastewater is therein led through an open channel to the UV plant and there is subjected to UV radiation in order to reduce the number of germs to such an extent that the clarified wastewater can, for example, be introduced into bodies of water. The disinfection power can therein be so high that the introduction into bathing water is admissible.

Wastewater treatment plants are normally constructed such that the water flows from an inlet, through various treatment steps, to an outlet, solely due to gravity, without pumps being required. Therefore it is also aimed, in UV treatment plants in wastewater technology, to keep the flow resistance as low as possible in order to achieve a likewise low pressure loss in the provided flow rate. Such a pressure loss is expressed, during the operation of the plant, in a height difference between the water level in the inlet and the water level in the outlet. It is aimed to keep this height difference as low as possible.

Because of the particularly favourable electrical efficiency, so-called mercury low pressure lamps are predominantly used for the water disinfection, which have an elongated lamp tube made from quartz in which a gas discharge between two electrodes generates the UV radiation. The length of such a lamp amounts to approx. 1.5 m. The lamps are inserted into cladding tubes made from quartz in a watertight manner, for protection against water and for maintenance of the operating temperature, said cladding tubes then in turn being arranged in the water to be disinfected. This assembly of UV lamp and cladding tube is subsequently referred to as a lamp.

Commercial plants, such as, for example, those used in the procedure of communal clarification plants, normally have a plurality of lamps, sometimes over 100 pieces.

In the case of plants having an open channel, also called a "gutter", there are various arrangements of the lamps. The lamps can lie horizontally and in parallel to the flow direction in the channel (see, for example, patent specification U.S. Pat. No. 4,482,809, which is incorporated by reference herein, and U.S. Pat. No. 6,500,312, which is incorporated by reference herein). The lamps can also lie horizontally and transversely to the flow direction, see patent specification U.S. Pat. No. 4,367,410, which is incorporated by reference herein. Finally, there are plants in which the lamps stand or hang vertically in the channel, for example in patent specifications U.S. Pat. No. 5,660,719, which is incorporated by reference herein, and U.S. Pat. No. 5,332,388, which is incorporated by reference herein.

Several UV lamps are combined into modules. These modules must be lifted from the channel for maintenance purposes in order, for example, to exchange individual lamps or to clean the lamp surface. Smaller modules having, for example, four to eight lamps can be lifted manually out of the channel. Larger modules require the use of a crane. Alternatively, modules can also be mounted to be able to pivot at one end (upstream or downstream), such as is shown, for example, in US patent application US 2008/0260602 A1, which is incorporated by reference herein. A module can then be pivoted upwards out of the channel. In the case of the patent application referred to, for this purpose a handle is provided, which enables the manual pivoting of the module. In the case of larger modules, it is also known to provide a rotary actuator, which pivots the module upwards out of the channel.

In particular for larger modules, which, for example, can have more than twenty lamps, the lifting-out with a crane is disadvantageous, because, on the one hand, a heavy hanging load must be moved, and on the other hand, in the case of vertically mounted lamps, an open position results in the channel, which is very deep and represents a fall hazard for personnel. Both circumstances represent a potential risk of accidents. In the case of modules which are provided with a rotary actuator, a free space is required in the channel due to the pivoting movement in the flow direction, which corresponds to the total length of the module. For this purpose, it is in turn required to keep the channel free for this length. A correspondingly long zone results in which a fall hazard can result for the personnel. The modules that have been pivoted upwards are situated, in the pivoted-out state, above the channel, which must be covered accordingly in order to be able to service the individual lamps. This is also seen as a disadvantage in practice.

SUMMARY OF THE INVENTION

It is therefore the object of the present invention to improve a UV water treatment plant having modules which contain several UV lamps, to the effect that the maintenance of the modules and the lamps outside of the channel becomes more simple and safer.

This object is achieved by a UV water treatment plant having at least one module which contains a number of elongated UV lamps in a bracket, wherein the lamps are orientated in parallel to one another, wherein a base having at least one guide connected firmly to the base and at least one guide rail connected to the bracket are provided, wherein the guide rail is mounted to be displaceable in the guide.

Because the modules are provided with a linear guide which runs substantially in parallel to the longitudinal axis of the UV lamp, and because a drive means is provided which can drive the modules over a guide element fixed to the channel, it is possible to drive the modules out of the channel in the direction of the longitudinal axis such that no additional open region of the channel is required. The free upper side of the channel required for driving out the module is thus minimal. It is advantageous if the module has a base plate which closes the upper side of the channel in the driven-out state of the module.

The base can be fixed on both sides on the side walls of the channel. Preferably, this occurs above the water line of the channel, such that the base and preferably also the drive means do not come into contact with the water for long periods. The base preferably has at least two guides, which are arranged laterally, close to the channel wall. Rails can be guided in these guides, which are fixed to the module and which enable a linear displacement of the module with respect to the base. The drive means is preferably an electromotor, which drives a gear rack connected to the module via a pinion. Hereby, a particularly high operational security is achieved if the electromotor is connected drivingly to the pinion via a self-locking gearing. Thus it can also be prevented, in the case of a sudden power failure, that the lifted module is lowered in an uncontrolled manner into the channel. Alternatively, a rope hoist driven by an electromotor can also be provided, likewise preferably having a self-locking gearing. Hydraulic or pneumatic drives can also be positioned which work with pistons/cylinder units.

It is particularly advantageous to arrange a module having a linear guide and a drive to lift the module out of the channel such that the lamps are orientated with their longitudinal axis in parallel to the plane of the adjacent side wall of the channel and are inclined with their longitudinal axis at an angle against the flow direction. The angle amounts to preferably between thirty and eighty degrees, particularly preferably is in a range between forty and sixty degrees between the lamp longitudinal axis and the substantially horizontal flow direction. In the case of such an angle, a particularly simple access to the lamps results, when the module is lifted out of the channel.

BRIEF DESCRIPTION OF THE DRAWINGS

Below, an exemplary embodiment of the present invention is described by means of the drawing. Herein are shown.

DETAILED DESCRIPTION OF THE INVENTION

Figure 1:
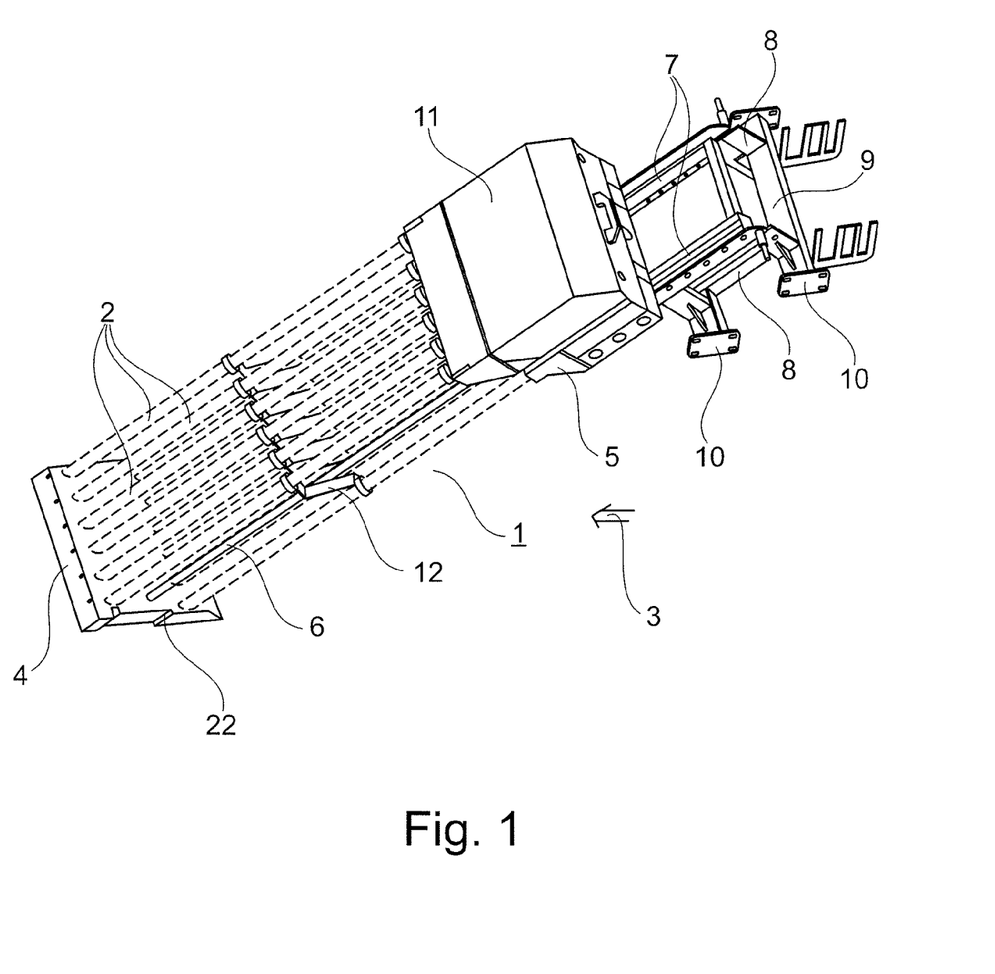
FIG. 1: a module having a base and a linear drive in a perspective view from above.

In FIG. 1, a module of a UV water treatment plant, referred to throughout with 1, is represented perspectively. The module comprises twelve lamps 2 in total, which each comprise an elongated UV mercury low pressure lamp that is not represented in more detail and a cladding tube, made from a UV-permeable material, enclosing the lamps. The module 1 is provided for installation in a channel in which water flows in the direction of the flow direction 3 indicated by the arrow. The module has a base plate 4, which rises to the base of the channel with its lower side that is not visible in FIG. 1. Furthermore, the module 1 has an upper frame 5, as well as longitudinal braces 6 which connect the base plate 4 to the frame 5. Furthermore, two guide rails 7 are attached to the rearward side of the module in FIG. 1, which is facing towards the flow direction 3, said guide rails 7 likewise connecting the base plate 4 and the frame 5 and running substantially in parallel to the elongated lamps 2 and the braces 6. The guide rails 7 protrude over the frame 5. The guide rails 7 are furthermore engaged with a base 8, which is able to be fixed, with cross braces 9 and fixing flanges 10, to the side walls of the channel that is not represented here, above the water line. In FIG. 1, the base 8 has no recognisable guides, in which the guide rails 7 are mounted to be displaceable in the direction of their longitudinal extension.

Furthermore, the module 1 is provided with a hood 11 in the region of the frame 5, said hood 11 covering the electrical connections of the lamps 2 from above, above the waterline in the channel. Finally, the module 1 bears a further cleaning device 12, which comprises a bracket and a cleaning ring for each lamp 2. The cleaning device 12 is, as is known from the prior art, displaceable in the longitudinal direction of the lamps 2 such that this is cleaned with a stroke along the lamp surface. For this purpose, a drive that is not visible in FIG. 1 is provided, preferably pneumatic or hydraulic.

Figure 2:
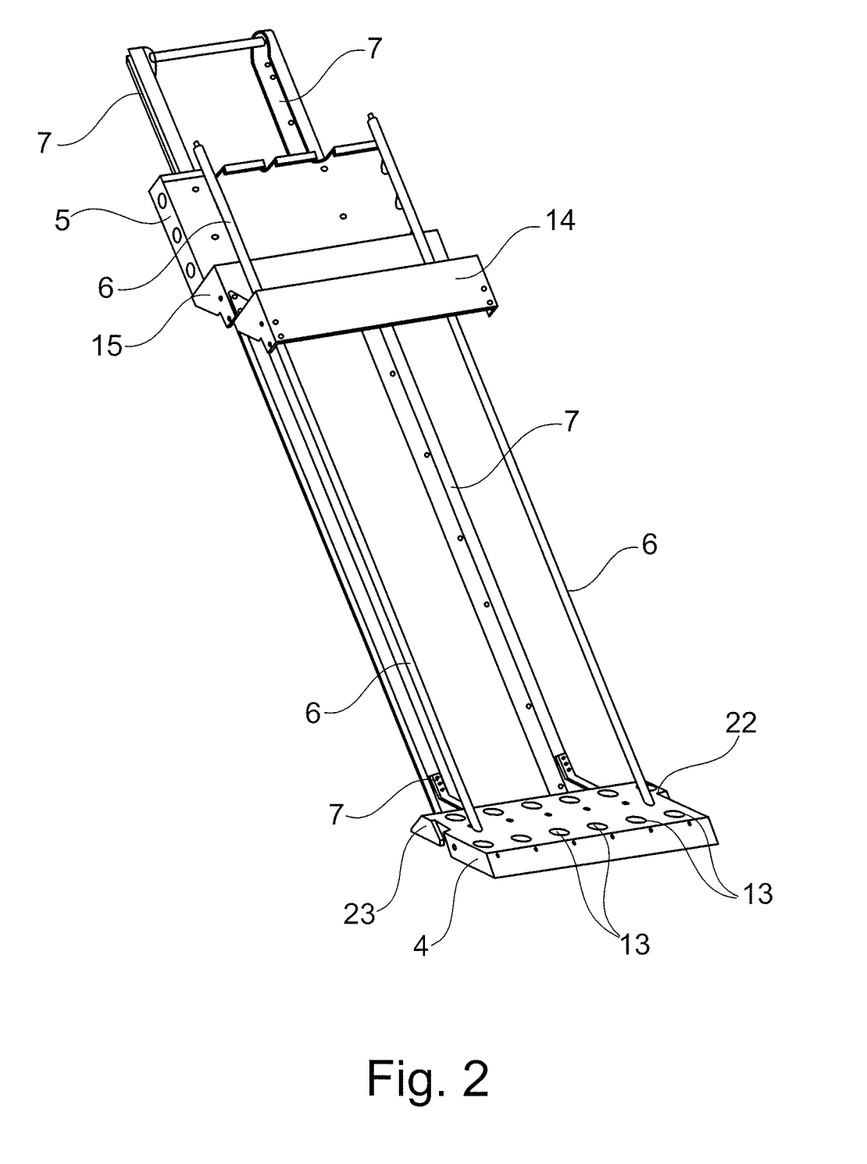
FIG. 2: the module from FIG. 1 without the base in another perspective representation.

In FIG. 2, the mechanically bearing part of the module 1 from FIG. 1 is represented, without the lamps, the electrical components and the base. The same components have the same reference numerals. It is recognisable that the base plate 4 has twelve recesses 13 into which the lamps 2 are introduced with their lower end which is facing away from the electrical connection. The lamps 2 are supported there. The frame 5 has corresponding openings for the upper end of the lamps 2. The openings are arranged in two stepped brackets 14 and 15 which are offset against each other. The openings themselves are not visible in FIG. 2. FIG. 2 demonstrates that the base plate 4 is arranged, during operation, horizontally in the channel, and that the braces 6 and the guide rails 7 are inclined against the horizontal at an angle of approximately fifty. The lamps, which are to be arranged in parallel to the braces 6 and the guide rails 7, take on the same angle during operation. It is further represented that the guide rails 7 are situated behind the plane in FIG. 2, which is formed from the six adjacent lamps.

The components represented in FIG. 2 are preferably produced from corrosion-resistant steel.

Figure 3:
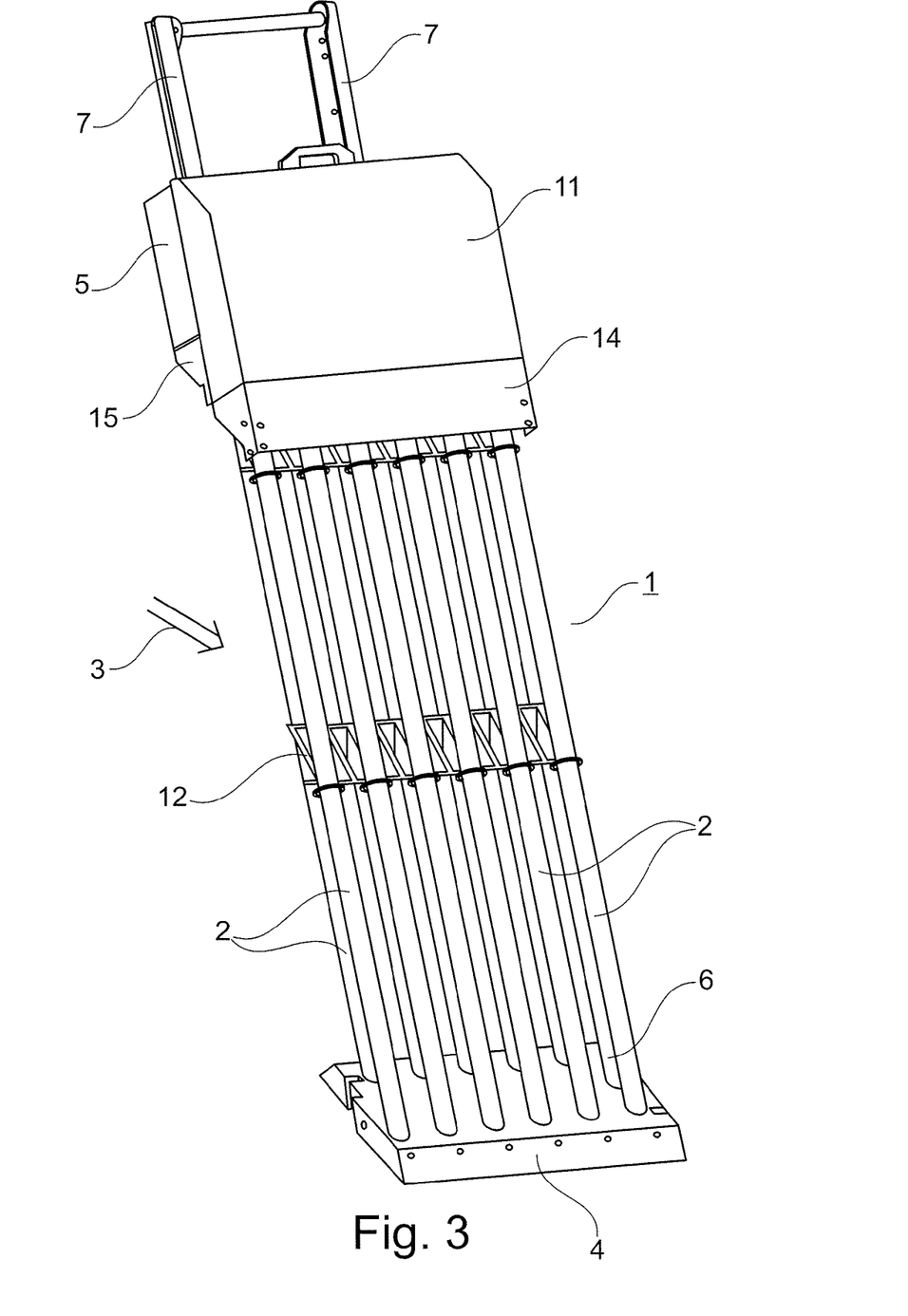
FIG. 3: the mechanical construction of the module from FIG. 2 without covers of the electrical parts and without lamps.

FIG. 3 again shows the module 1 having the bearing elements from FIG. 2 and the electrical components, which were already represented in FIG. 1, however without the base shown in FIG. 1. Again, the same components have the same reference numerals.

Figure 4:
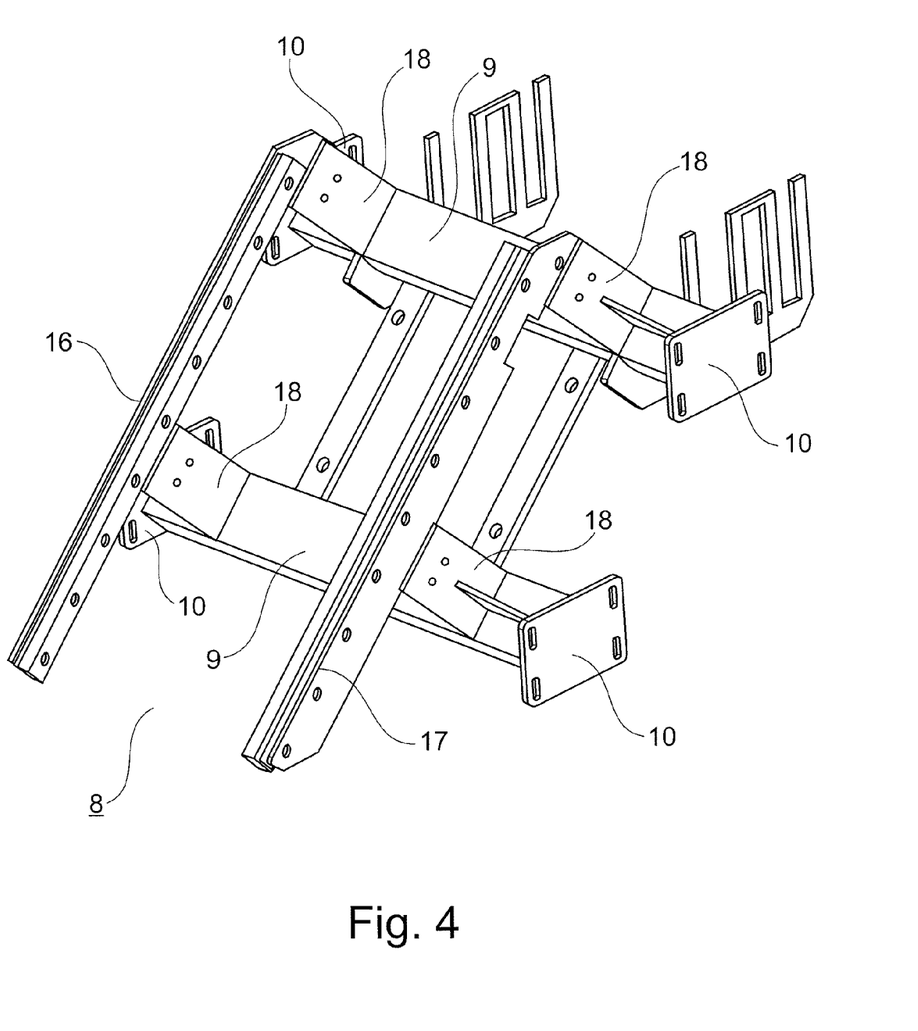
FIG. 4: a base for the module according to FIG. 1 in a perspective representation without drive means; as well as FIG. 5: the base from FIG. 4 having an electromotor drive.

In FIG. 4, the base 8 from FIG. 1 is represented in an enlarged manner in a perspective representation. The base 8 has the cross brace 9 as well as the fixing flanges 10, which are formed here as plates for fixing on the inner side of the channel wall. Two longitudinal guides 16 and 17 are firmly connected to the cross braces 9 via fixing elements 18. The guides 16 and 17 are provided with a free cross-section which runs in the longitudinal direction of the guides 16 and 17 and which is formed such that the guide rails 7 from FIGS. 1 to 3 can be mounted therein to be displaced longitudinally. Preferably, the guides 16 and 17 are also formed such that a tipping of the guide rails 7 towards the guides 16 and 17 is not possible. The interaction of the guide rails 7 with the guides 16 and 17 is then a linear guide, the guide direction of which is orientated substantially in parallel to the longitudinal axis of the lamp 2.

Figure 5:
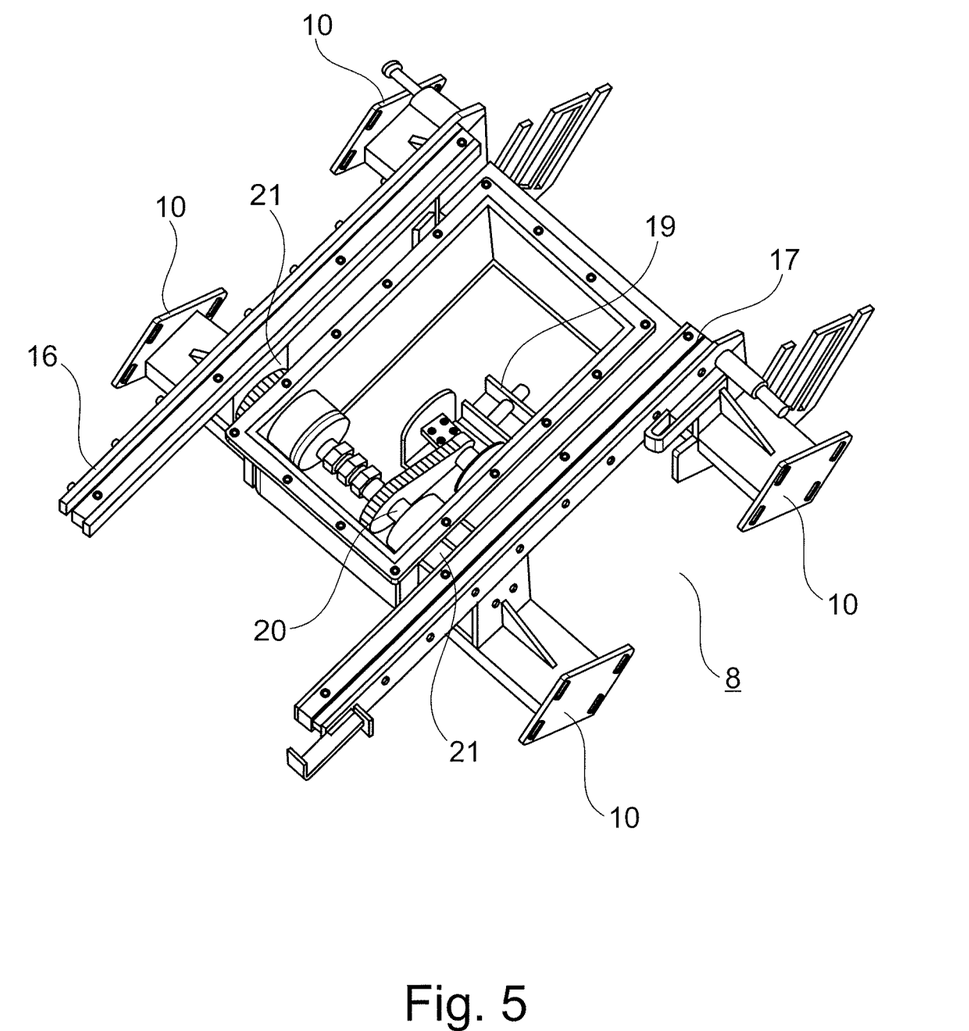

FIG. 5 shows the base 8 in a similar representation to FIG. 4, however having a drive 19 provided therein. The drive 19 is formed here as an electromotor drive, which drives two pinions 21 via a preferably self-locking gearing 20. The pinions 21 in turn act together with a linear toothing according to the type of gear rack, which is arranged on the rear side or underside of the guide rails 7 which is not visible in FIG. 2.

Together with the guide rails 7, the base 8 having the drive 19 then enables a controlled, straight-line lifting of the module 1 out of the channel by starting up the drive 19.

During operation, the module according to FIG. 1 can be used in a UV water treatment plant as follows. It can be used in a small plant as an individual module in a channel, which has a clear width which corresponds to the distance from two opposing fixing flanges 10. The height of the channel from the base to the water level then corresponds approximately to the vertical projection from the underside of the base plate 4 to the underside of the frame 5. In the channel are then arranged twelve lamps 2 in total, which can be used to disinfect the water. The channel is expediently covered on its upper side such that no UV radiation can escape and such that neither people nor objects can fall into the channel.

For the maintenance of the lamps 2, the module 1 can then be lifted out, upwards over the cover of the channel, by starting up the drive 19. The drive 19 then drives the two pinions 21 via the gearing 20, said pinions 21 then driving the guide rails 7 in the guides 16 and 17 out of the channel, upwards at an angle to the horizontal, via their engagement with the toothing of the guide rails 7. This procedure is preferably continued until the base plate 4 is approximately level with the cover of the channel. The lamps 2 and also the electrical connections underneath the cover 11 are then freely accessible without an opening resulting in the cover of the channel which would represent a potential source of danger. The base plate 4 covers the free cross-section of the cover of the channel, into which the module is driven. In the case of the represented embodiment, it is particularly advantageous that no guides are required underneath the water line. The guide rails 7 are guided exclusively into the base 8 which is situated completely above the water line. This embodiment minimises the required installations in the channel and ensures a particularly high operational security.

In the case of larger channels, several modules 1 can be arranged one behind the other in the flow direction 3. Herein, then each module can be lifted out of the channel individually, wherein again no large opening results in the cover of the channel, as the base plate 4 of the respective module, in the case of the lifted-out module, seals the upper side to such an extent that the danger of people or objects falling into the channel does not exist.

Several modules 1 can also be inserted next to one another, transversely to the flow direction, if the channel has a multiple width of the distance between two opposing fixing flanges 10. The edge-side modules can then be fixed on the channel wall with two fixing flanges 10. Modules lying inside the channel are fixed to one another with the flanges which are allocated to one another, and thus are linked to one another in a direction transverse to the flow direction 3. The function for lifting the module out of the channel for a service is therein described the same as above. Each module can be lifted out of the channel at an angle individually by starting up the drive 19, without a gap resulting in the cover of the channel. The module then protrudes upwards over the cover and is simply accessible for maintenance purposes. These advantages are achieved in that the module 1 having the linear guide, which results from the combination of the guide rails 7 with the guides 16 and 17, can be driven in a straight line out of the channel and driven in again.

A further feature is evident from the overview from FIG. 1 and FIG. 2. The base plate 4 has an offset approximately in the centre on a left narrow side 22, seen in the flow direction 3, said offset occurring transversely to the flow direction. The section of the narrow side 22 lying upstream lies offset by an amount with respect to the downstream part. The offset corresponds approximately to the lateral offset of the two lamp rows of the lamps 2 against each other. In FIG. 2, the base plate 4 is visible from the other side. The offset is provided accordingly here in a narrow side 23. The narrow sides 22 and 23 run in parallel to each other.

The narrow sides 22 and 23 are to an extent complementary to each other, such that adjacent structurally identical base plates can be placed next to one another substantially without gaps. In the case of an arrangement having several modules next to one another, it can thus be achieved that the distances and the relative positions of adjacent lamps 2 from two adjacent modules are exactly defined, such that no gaps having low UV intensity can result between the adjacent lamps. If necessary, the narrow sides 22 and 23 can also be provided with complementary grooves and pins or bars, which enable a securing of two base plates 4 on one another such that they cannot be displaced in parallel to the base of the channel against one another, but can be separated from one another in the direction of the guide.

The upper frame 5 preferably has the same offset in its side walls running in the flow direction as the base plate 4.

The invention claimed is:

1. UV water treatment plant having at least one module which contains a number of elongated UV lamps in a bracket, wherein the lamps are orientated in parallel to one another, wherein a base having at least one guide connected firmly to the base and at least one guide rail connected to the bracket are provided, wherein the guide rail is mounted to be displaceable in the guide.

2. UV water treatment plant according to claim 1, wherein the guide forms a linear guide with the guide rail.

3. UV water treatment plant according to claim 2, wherein the linear guide runs substantially in parallel to the longitudinal axis of the lamps.

4. UV water treatment plant according to claim 1, wherein a drive means is provided and installed, to drive the bracket having the lamps with respect to the base in the direction of the guide.

5. UV water treatment plant according to claim 4, wherein the drive means is an electromotor, which drives a gear rack connected to the module via a pinion.

6. UV water treatment plant according to claim 5, wherein the electromotor is connected drivingly to the pinion via a self-locking gearing.

7. UV water treatment plant according to claim 1, wherein the module has a base plate.

8. UV water treatment plant according to claim 1, wherein the base is provided with fixing devices which are able to be fixed on both sides on opposing side walls of a channel.

9. UV water treatment plant according to claim 8, wherein the lamps (2) are orientated with their longitudinal axis in parallel to the plane of the adjacent side wall of the channel and are inclined with their longitudinal axis at an angle against the flow direction.

10. UV water treatment plant according to claim 9, wherein the angle amounts to between thirty and eighty degrees between the lamp longitudinal axis and the substantially horizontal flow direction.

11. UV water treatment plant according to claim 1, wherein the base has at least two guides which are arranged laterally.

* * * * *